(12) United States Patent
Nyfelt

(10) Patent No.: US 7,138,920 B2
(45) Date of Patent: Nov. 21, 2006

(54) METHOD FOR MONITORING THE MOVEMENTS OF INDIVIDUALS IN AND AROUND BUILDINGS, ROOMS AND THE LIKE

(75) Inventor: Leif Nyfelt, Skovde (SE)

(73) Assignee: Jan Bengtsson, Askim (SE)

( * ) Notice: Subject to any disclaimer, the term of this patent is extended or adjusted under 35 U.S.C. 154(b) by 71 days.

(21) Appl. No.: 10/472,211

(22) PCT Filed: Mar. 4, 2002

(86) PCT No.: PCT/SE02/00371

§ 371 (c)(1),
(2), (4) Date: Mar. 8, 2004

(87) PCT Pub. No.: WO02/075352

PCT Pub. Date: Sep. 26, 2002

(65) Prior Publication Data

US 2004/0135694 A1   Jul. 15, 2004

(30) Foreign Application Priority Data

Mar. 20, 2001  (SE) ................... 0100973

(51) Int. Cl.
G08B 23/00 (2006.01)

(52) U.S. Cl. ................ 340/573.1; 340/572.1; 340/539.1; 340/539.13; 340/525; 340/825.49

(58) Field of Classification Search ............ 340/573.1, 340/573.3, 572.1, 572.4, 572.7, 572.8, 539.1, 340/539.13, 539.14, 540, 541, 425.5, 525, 340/825.69, 825.49; 345/419, 473, 474, 345/475; 701/204, 220
See application file for complete search history.

(56) References Cited

U.S. PATENT DOCUMENTS

| | | | |
|---|---|---|---|
| 4,471,345 A | | 9/1984 | Barrett, Jr. |
| 4,484,192 A | * | 11/1984 | Seitz et al. ............ 340/995.18 |
| 5,517,429 A | * | 5/1996 | Harrison ..................... 342/378 |
| 5,543,797 A | * | 8/1996 | Hochstein et al. ......... 340/10.2 |
| 5,694,533 A | * | 12/1997 | Richards et al. ............ 345/420 |
| 5,920,261 A | | 7/1999 | Hughes et al. |
| 6,411,208 B1 | * | 6/2002 | Buess et al. ................ 340/540 |
| 6,834,436 B1 | * | 12/2004 | Townsend et al. ............ 33/512 |
| 6,856,238 B1 | * | 2/2005 | Wootton et al. ........... 340/5.61 |
| 2004/0021569 A1 | * | 2/2004 | Lepkofker et al. | |

FOREIGN PATENT DOCUMENTS

| | | |
|---|---|---|
| DE | 197 08 841 | 9/1998 |
| FR | 2 760 551 | 9/1998 |
| WO | WO 98/37932 | 9/1998 |
| WO | WO 01/53852 | 7/2001 |

* cited by examiner

Primary Examiner—Hung Nguyen
(74) Attorney, Agent, or Firm—Young & Thompson

(57) ABSTRACT

A method of monitoring the movements of an individual in and around buildings, rooms and other spaces, where each individual carries a passive transponder which has an individual-unique identity and which is for co-action with an active antenna that is connected, either directly or indirectly, to a monitoring center for transmitting signals received from transponders, and where a plurality of antennas are placed in and around the buildings, rooms or other spaces to be monitored. The signals transmitted to the exercise center are used to show movements of the individual in the form of a three-dimensional animated picture on a picture screen.

19 Claims, 4 Drawing Sheets

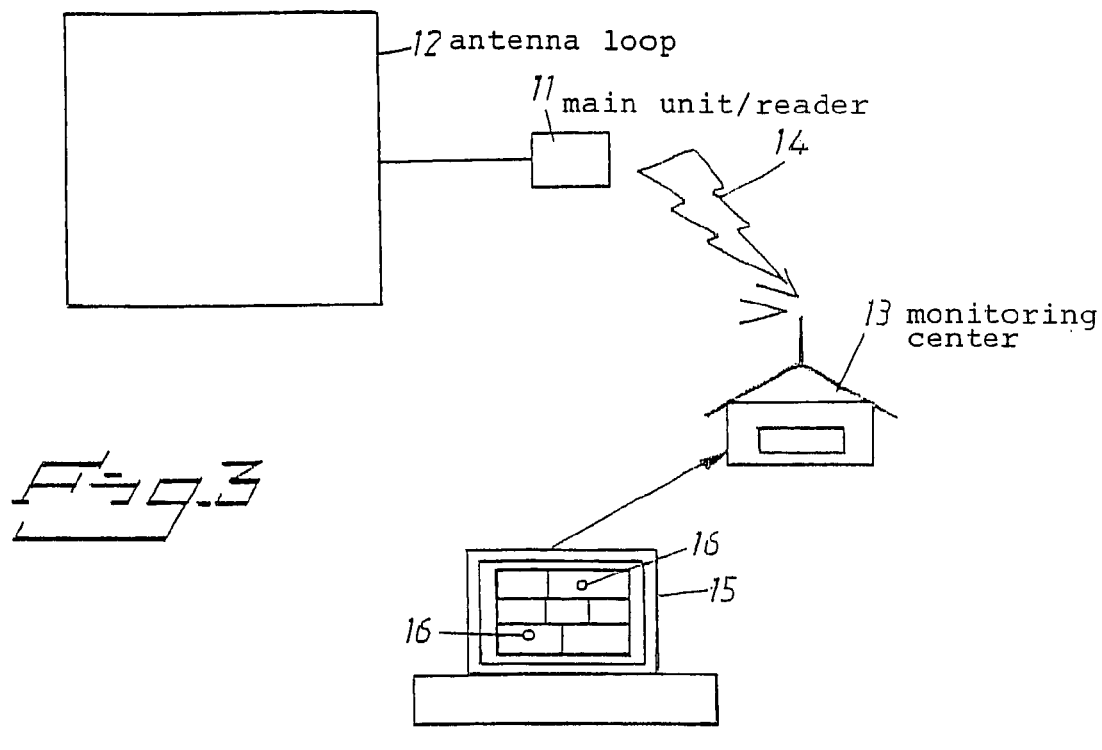
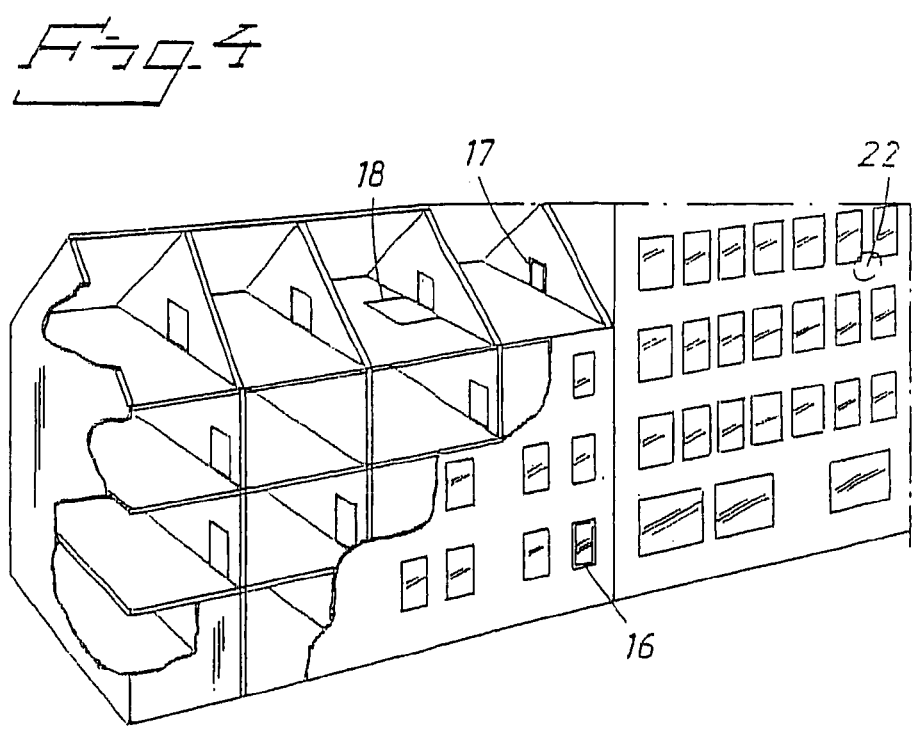

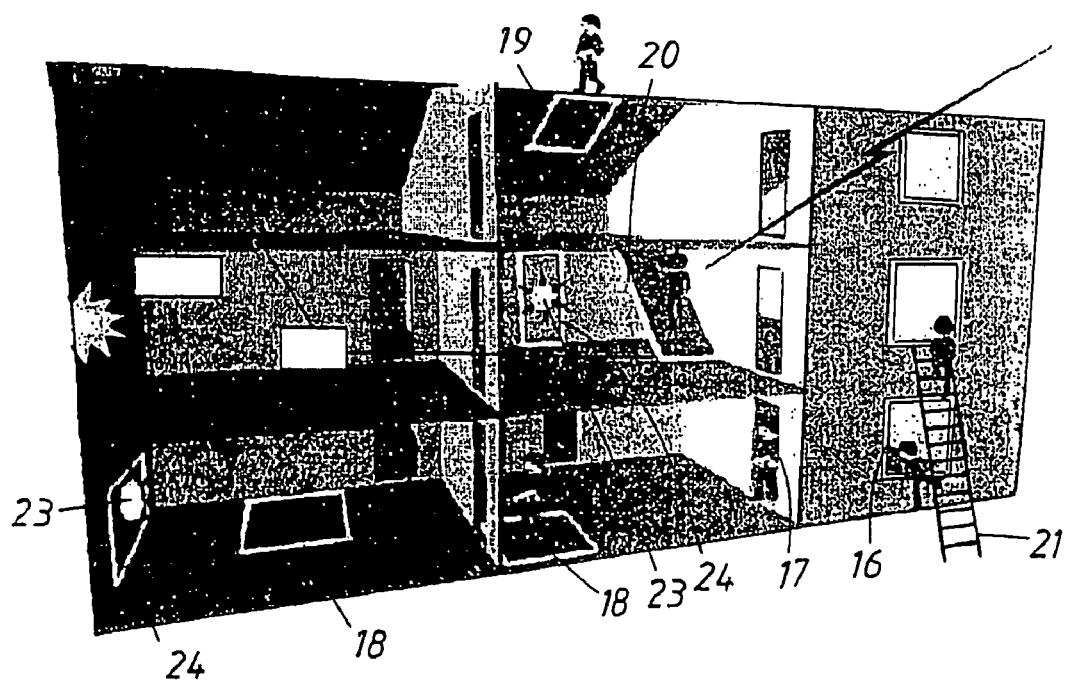

METHOD FOR MONITORING THE MOVEMENTS OF INDIVIDUALS IN AND AROUND BUILDINGS, ROOMS AND THE LIKE

BACKGROUND OF THE INVENTION

The present invention relates to a method of monitoring the movements of an individual in and around buildings, rooms and other spaces, and then particularly a method of enabling the movements of individuals to be monitored during military or civilian exercises.

DESCRIPTION OF THE RELATED ART

In respect of military exercises there exist systems for monitoring the movements and relocations of separate individuals or entire troops and/or vehicles in open terrain or territory. These systems are used to be able to verify that taught and practised movement patterns are actually followed during exercises, and to be able to check, for instance, the manner in which soldiers move in battle exercises. These systems utilise GPS systems, wherewith individuals and/or vehicles are equipped with a GPS transmitter which enables the exercise command organisation, for instance, to follow the movements of the individuals/vehicles with the aid of signals transmitted to computer screens via satellites. One drawback with such monitoring systems is the very high costs involved, caused by the fact that each individual/vehicle is required to carry expensive position-locating equipment (GPS transmitter). Another drawback is that such systems solely function out in the terrain. Neither do they produce the desired accuracy. This accuracy deficiency is caused because data in the GPS system "hovers" and has an uncertainty factor of about ±10 m in both the X-direction and the Y-direction. This makes the system difficult to use in built-up areas and in buildings, owing to the fact that it is difficult to establish the location of the individual/vehicle in relation to the building. This degree of uncertainty is still greater when the individual enters a building, wherewith it cannot be established with certainty that the individual actually moves inside the building, or remains stationary.

Consequently, the aforedescribed method is unsuitable for monitoring the movements of an individual inside a building. Instead, the use of video cameras has been relied upon to this end, these cameras enabling the movements of the individual to be followed on video monitors connected to the cameras. However, one drawback with the use of video monitors is that they do not register the identity of the individual shown on the monitor. Moreover, these latter systems function poorly, or not at all, in the dark or in smoke-filled and water-filled spaces.

PCT/SE00/00530 describes a method in which an active or passive transponder, for instance a passive transponder, a so-called tag, co-acts with a passive or an active antenna which is connected, either directly or indirectly, to a monitoring arrangement, and wherewith the individual solely carries a transponder or an antenna, and in which one or more antennas or a number of transponders are positioned in the building to be monitored.

When configured appropriately, the method taught by the aforesaid PCT application enables the location of each specific individual in the building to be established with centimetre-accuracy, and also enables information to be obtained as to whether said individual is walking, creeping or wriggling forwards in the building. However, the method lacks the possibility of providing realistic reproduction of the course of events recorded in the monitoring arrangement. Moreover, simultaneous recording of the course of events with the aid of video cameras positioned in the building does not provide a good solution, since, in such case, two separate courses of events will be shown due to the impossibility of integrating these events. Video cameras also have limitations with respect to dark and/or smoky conditions.

SUMMARY OF THE INVENTION

Accordingly, the object of the present invention is to provide a method with which the aforesaid drawbacks and deficiencies can be avoided.

The object of the present invention is achieved with a method of monitoring the movements of an individual in and around buildings, rooms and other spaces, wherein each individual carries a passive transponder which carries an individual-unique identity and which is intended for co-action with an active antenna that is connected, either directly or indirectly, to a monitoring centre for transmitting signals received from the transponder, and wherein a plurality of antennas are placed in and around the buildings, rooms or other spaces to be monitored, and wherein the signals sent to the monitoring centre are used to show movements of the individual in the form of a three-dimensional animated picture on a picture screen.

With the aid of the signals sent to the monitoring centre, a computer program is able to compute these signals so as to be able to show movement of the transponders as animated pictures of the individuals carrying the transponder in an animated environment true to reality.

The manner in which the individual moves forwards can be determined through the medium of said antennas, by providing identity-defined transponders on different parts of the individual's body, e.g. on his/her feet, knees, stomach and hands, and therewith illustrate the way in which the individual moves realistically, in the animated pictures. Another object of the invention is to enable the use of equipment by the individuals to be monitored and shown. This can be achieved by also providing the equipment with transponders, antennas or other signal emitters that illustrate their use, said use also being shown in the animated picture.

The signals transmitted to the monitoring unit are stored in a computer at given points in time regarding the generation of each signal. When producing the animated recording of a sequence of events, it is therewith possible to follow those events that one desires to see. For example, it can be chosen to follow the reaction of an individual, or, alternatively, to monitor a room or a building and "see" what is happening in the room or building in the time sequence in which the event/events takes/take place and with the individual or individuals that was/were present.

BRIEF DESCRIPTION OF THE DRAWINGS

The invention will now be described with reference to two non-limiting embodiments thereof, shown partially in the accompanying drawings, in which

FIG. 3 illustrates the principle construction of a monitoring system according to the invention;

FIG. 4 is a schematic perspective view of a building comprising several floors or stories and intended for training and exercising purposes with the aid of the inventive method;

FIG. 5 is a schematic view similar to the view of FIG. 4;

DESCRIPTION OF THE PREFERRED EMBODIMENTS

Figure 1:
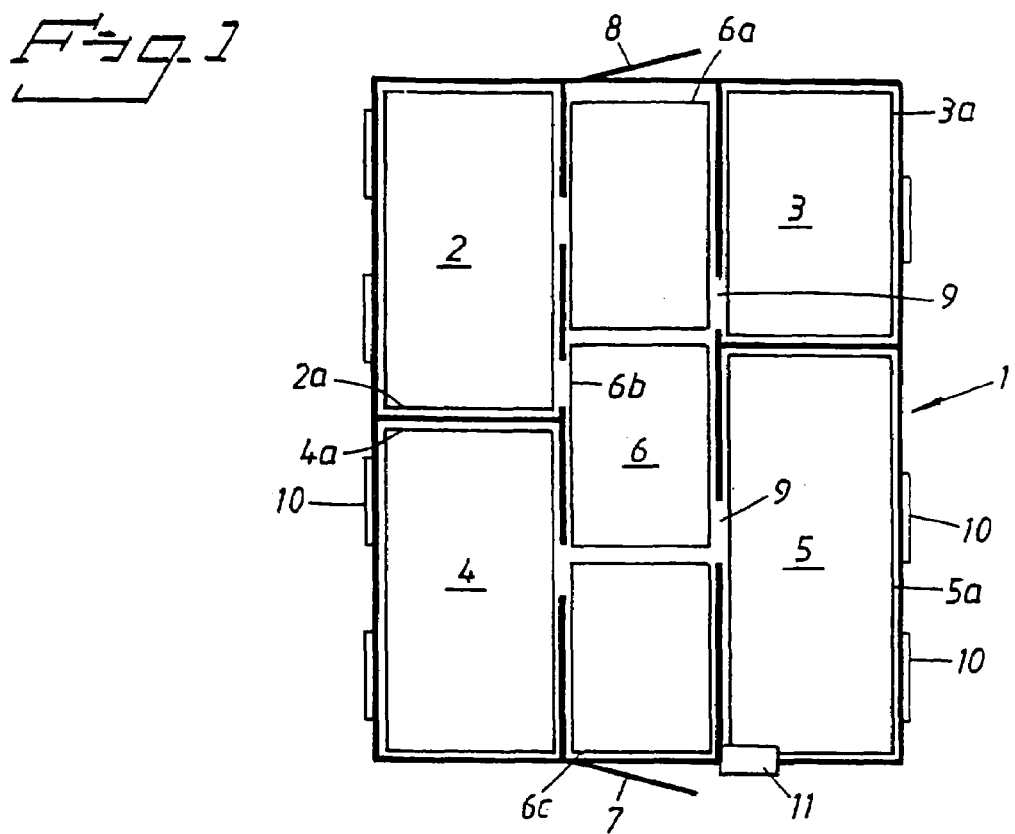
FIG. 1 is a schematic plan view of a building in which a number of antennas have been installed, said figure being intended to illustrate a fundamental condition in respect of the inventive method.

Thus, FIG. 1 is a schematic plan view of a building 1, which includes four rooms 2, 3, 4, 5 and an intermediate corridor 6. Entrance doors 7, 8 are located at respective ends of the corridor, and door openings 9 lead from the corridor 6 into respective rooms. Respective rooms also include outwardly facing window openings 10. Because the building described is contemplated solely for use for exercising or training purposes, the window openings 10 contain no glass, and neither do the door openings 9 contain inner doors. However, it will be understood that both windows and inner doors may be provided in the building, regardless of the building being intended as an exercise building.

In the FIG. 1 embodiment, an antenna loop 2a, 3a, 4a, 5a is installed in each room 2–5, and three antenna loops 6a, 6b and 6c are installed in the corridor 6. The antenna loops are of the kind used in radio frequency monitoring equipment, so-called RFID antennas. Each of these antenna loops are active antennas that are coupled to a main unit/reader 11, the function of which is to register/read where an individual carrying a transponder, e.g. a passive element, a so-called tag, enters the detection area of the active antenna. The main unit/reader 11 sends the recorded information to a monitoring centre, this centre being described in more detail with reference to the description of FIG. 3 below. The antenna loops 2a, 3a, 4a, 5a, 6a, 6b, 6c are preferably disposed in the floor or in the walls close to the floor in respective rooms, although they may also be disposed at other places in respective rooms, so that they will essentially surround respective rooms or parts thereof, for instance may also be disposed in the ceiling of respective rooms.

The antenna loops may be laid out permanently in the room, e.g. disposed beneath the floor covering or moulded in the floor, and may, alternatively, be removable, for example by arranging them in a mat or carpet that can be laid out and rolled up. A mat or carpet of this nature may be provided at one of its edges with an electrical contact for connection to the antenna loops provided in the mat.

Although not shown in the figure, antenna loops may also be arranged around, for example, the window openings 10 or the door openings 9 for the inner doors, and also around the door openings for the entrance doors 7, 8. This also enables the precise path taken by an individual into or out of the building 1 to be recorded.

Figure 2:
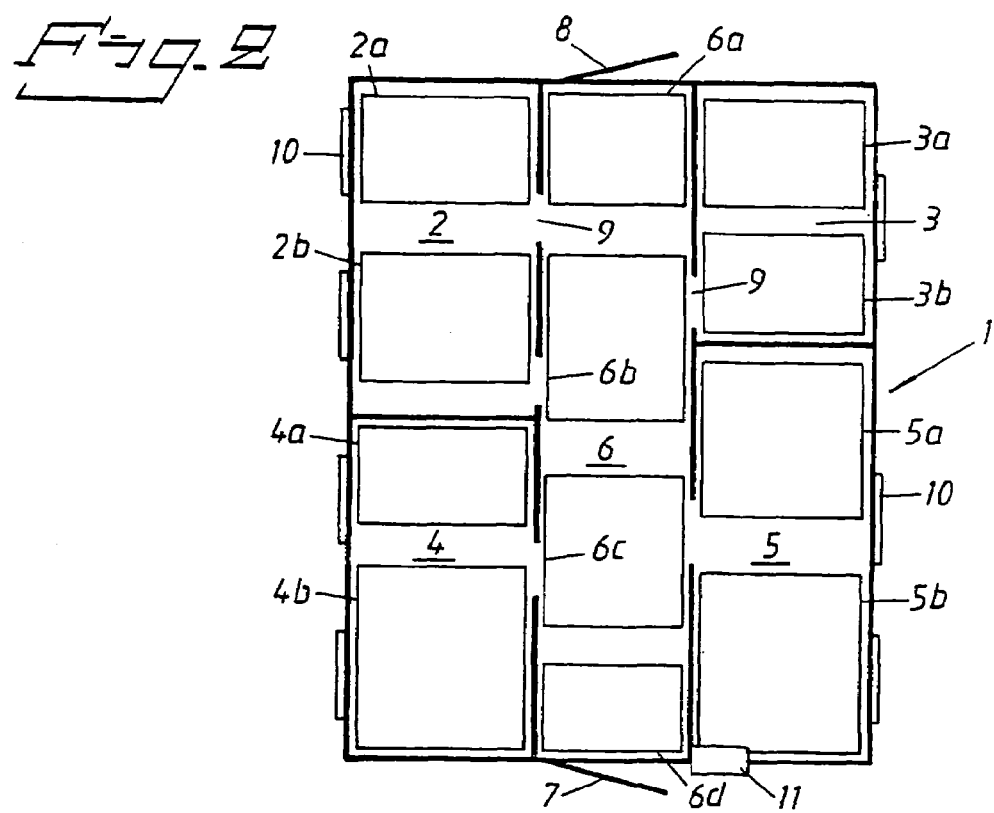
FIG. 2 illustrates another embodiment of the antenna arrangement when carrying out the inventive method.

FIG. 2 illustrates another embodiment of the antenna arrangement when practising the inventive method, wherein the antenna loops provided in said rooms are each divided into two parts. In FIG. 2, the antenna loops in room 2 are referenced 2a and 2b, are referenced 3a and 3b in room 3, are referenced 4a and 4b in room 4, and are referenced 5a and 5b in room 5. Four antenna loops 6a–6d are now arranged in the corridor 6. As a result of this division of the antenna loops, a signal is now sent from the loop in which an individual, carrying his/her transponder, a so-called tag, passes. It is also possible to see in the monitoring unit that part of the room in which the individual carrying said transponder is situated. It is, of course, possible to divide the rooms into still smaller units, with an antenna loop for each unit, so as to obtain a more precise indication of the location of each individual.

The transponders, tags, carried by respective individuals contain a specific code for each transponder, in a manner known per se, this code being transmitted by the active antenna so as to identify the individual passing into the detection area of the antenna loop concerned. By registering which transponder has been given to respective individuals, it is possible to follow the movement of each individual in the building 1 when antenna loops have been distributed in the manner described with reference to FIGS. 1 and 2. The individuals, persons, may carry different transponders on their respective bodies, for example one transponder on his/her foot, one transponder on his/her knee, and one transponder on his/her chest. When the antenna loops have a transponder detection range of only a decimetre, it can be determined with the aid of data from the antenna loop whether the person concerned passing into the loop is walking, creeping or wriggling on his/her stomach. In this latter instance, signals will be received from all three transponders carried by the person, while only one signal is received from the foot-carried transponder when the person concerned is walking. Thus, this enables the performance and efforts performed by persons in the building to be monitored and checked more effectively than if a person carried only one single transponder which merely indicated that he/she was present in the room concerned.

As was before mentioned, FIG. 3 illustrates the principle construction of a monitoring system that uses the inventive method. The illustrated system includes an antenna loop 12 (corresponding to one of the antenna loops a, b, c or d in FIG. 1 or 2), which is connected to a main unit/reader 11 which, in turn, forwards to a monitoring centre 13 the information/data obtained through the medium of the antenna loop 12. Transmission of information/data from the main unit/reader 11 to the monitoring centre may, for instance, be effected through the medium of a cable or radio 14. By delivering all information to a computer in the monitoring centre 13, there can be shown on a computer screen 15 a presentation of the movement carried out by the individuals in the building 1, for example in the form of a three-dimensional drawing of the building with the position and movement of each individual in the building being illustrated as an animated mobile figure. Additional information, such as the name of each individual, may also be shown on the screen 15 by appropriate programming of the computer. All information shown instantaneously on the screen may, of course, be saved and shown later to those who have been involved directly in the exercise, for a study of the result of the exercise.

Each registered movement or measure is recorded suitably with a statement of the exact time point, place, involved persons, etc., so as to later be able to play back the sequence of events on the basis of desired conditions, for example follow a given person or follow what has taken place in a building or a room.

If, as before mentioned, transponders having defined identities are placed on different parts of the body of each individual, e.g. on the feet, on the knees, on the stomach and on the hands, it will be possible to determine, via the positions of respective antennas, the way in which the individual moves, and therewith be able to illustrate this on the animated pictures in a realistic fashion. Thus, it will be possible to present in the animated picture an image of the individual that shows the way in which he/she moves, i.e. in a walking, creeping or wriggling mode.

By positioning antenna loops at strategic positions in a building, it is therefore possible to follow the movement of each individual as he/she enters and moves within the building. As shown in FIG. 4, for example, antenna loops 16 may be installed around window openings in a building for detecting entrance of the individuals into the building through a window opening. Naturally, corresponding arrangements can be placed at the door openings present in the building. Antenna loops 17 are also disposed inside the building around the internal door openings, for detecting the entrance of individuals into different rooms of the building. Similarly, the floors of respective rooms may include antenna loops 18 that cover the floor more or less completely but are divided into different sections, so that the way in which individuals move in the various rooms can be followed.

Placement of antenna loops 19 internally of the roof of the buildings (see FIG. 5) will also enable the manner in which a person moves on the roof of a building to be followed in detail. When the building includes roof hatches and the like through which a person is able to enter the building, these entrances will, of course, preferably be provided with antennas around their respective openings, so as to enable the passage of a person into the building to be monitored and recorded. Similarly, building stairways will also conveniently be provided with antenna loops 20, so as to enable movement of persons between the different floors or stories in the building to be followed.

The inventive method can also be applied to simulate a battle in an entire built-up area; i.e. not only in a building, but in an entire city, town or the like. In this case, active antennas may be placed in several buildings in the town, and also in streets and other open places. This enables the movement of a person through the town to be followed and also enables the person to be tracked as he/she enters a building, by means of antennas installed in the building. Antennas may also be placed externally on the building, for instance at the corners of the building, and also around the windows, so that persons passing outside the building can be recorded.

Auxiliary devices, such as ladders 21, may also be placed around the buildings in the town, which devices can be used by persons involved in the exercise to enter the buildings or used in some other way. These auxiliary devices may also be equipped with transponders, so as to enable movement of said devices to be registered/recorded. For example, if a ladder 21 is equipped with a transponder and the ladder is raised against a window through which a person can enter the building, this can be recorded partly as a result of the ladders being moved past antenna loops on the street and partly because the window opening is equipped with an antenna loop 16, so that placement of the ladder against the window will be registered by the window antenna loop as it detects the transponder on the ladder 21. This can also be animated in a recording and shown correspondingly as movement of the individuals in and around the buildings.

The buildings may also contain furniture and other objects that may be equipped with transponders, so that shifting or re-arrangement of the furniture and objects, for instance to build barricades inside the building, can be detected and recorded. The transponders may be provided with built-in inclination sensors/position sensors, so as to also be able to follow how furniture is used as protection or to build barricades. Similar to the aforesaid, this can also be animated and shown three-dimensionally when studying the exercise.

The buildings in the town may also be provided with hit-acknowledging detectors 22 which, e.g. with the aid of prisms, record the "hits" achieved on buildings in respect of simulated weapon firing. These detectors can "record" hits achieved with heavy artillery, guns, or tank artillery, mortar fire, and also hits achieved with handguns. When the hit acknowledging detectors are also able to determine the type of weapon that has been fired, through the medium of said hit signals, it is also possible, by programming, to arrange for these weapon hits to activate both simulation of damage in the building that is significant with respect to those in the vicinity of the damage, for instance simulated fire, smoke, water, etc., and also to record in the monitoring system the elimination of those persons situated in the part of the building concerned. Fire and smoke may, for instance, be simulated, by using rotating yellow and red light supplemented with smoke activation. Water leakage, for example as a result of a broken water pipe, can be simulated with the aid of water sprinklers that are activated externally of the recorded "weapon hit". Such events may also be shown in an animated form on a picture screen when playing back a sequence of events.

In addition to recording the movement of an individual and his/her passage through doors or windows, the inventive method also enables the recording to be coupled to the firing of a weapon, for example. The recording can take place by providing the weapon with a contact element connected to the trigger of the weapon which controls a tag/transponder to emit a "firing code" which can be discerned and registered by the antenna loops in the room and, in this way, forward firing information to the monitoring unit. It is therewith possible to determine which weapon has been fired and the number of times of firing the weapon. The weapon may also be equipped with gyros or other types of direction sensors, which also enable the direction in which the weapon has been sighted to be recorded. This can also be shown in an animated form on a picture screen when playing back a sequence of events.

Direction sensors may also be placed on the heads of respective individuals taking part in an exercise, so that the direction in which individuals are looking can be recorded by a sequence of events. What the individual sees can also be animated.

Practice hand grenades used in the exercise may also be provided with a tag/transponder so that the path travelled by a grenade thrown into the building, e.g. through a window, can be recorded with the aid of antenna loops positioned in the buildings. The place where the hand grenade lands in the building can also be recorded in this way. Such information is forwarded by the antenna loop/main unit to the monitoring unit, where all of these pieces of information can be registered and recorded, together with the effect of the grenade on those individuals that may be present in the building. Such grenades may also include a "time delay", such that a code will be sent from the hand grenade for as long as it remains inactive, and such that another code will be transmitted subsequent to explosion of the grenade, so as to be able to ascertain whether or not the grenade was thrown at the right moment, and also to be able to ascertain whether persons in the vicinity of the hand grenade were able to move to safety or not. The grenade may also include a transponder which will emit a signal whilst the hand grenade is safe, and another code when the hand grenade has been armed.

Explosions can be simulated by providing dummy explosives 23 with transponders that send, in a corresponding manner, signals to antennas 24 in their proximity, subsequent to having been placed in position. Such dummy explosives 23 may also include a "time delay" that can be activated when the dummy explosive has been primed and that causes recording of the detonated dummy explosive to take place with a delayed effect. The dummy explosives may have mutually different sizes and deliver mutually different signals, dependent on size, so that the effect of the primed dummy explosive when exploding can be determined directly in the monitoring computer.

In conjunction with the aforesaid dummy explosives 23, there may also be arranged hatches or doors which are, e.g., locked with electric locks and which are intended for practising explosion exercises and which, subsequent to priming a dummy explosive and triggering said dummy, can be opened automatically, so as to simulate in this way the "real" destruction by explosive means, where the persons carrying out the exercise are hindered by the closed door and find it necessary to blow the door apart, and also find it necessary to protect themselves against their demise as a result of the explosion. As will be understood, this latter event can be controlled with the aid of antenna loops disposed in the floor around the hatch or door, so that the locations of respective persons during this time period can be monitored.

The inventive method is not solely useful for military purposes, but can also be used for more civil exercises, for example in training smoke divers or riot police, so as to enable movement of the individual concerned in a building to be readily monitored.

The inventive method can also be used beneficially in evaluating the search result of so-called tracker dogs or sleuth-hounds. The inventive method is highly beneficial for monitoring the movements of a dog and its way of searching a building, as the dog can be let into the building on its own and the movements of the dog and its search through the building followed precisely on a computer screen with the aid of the inventive method.

The inventive method is favourable from the aspect of cost in comparison with those monitoring systems used hitherto, since each individual need only carry one transponder as opposed to the known corresponding methods in which each individual is required to carry a radio and GPS transmitter, which do not, nevertheless, afford the same degree of accuracy as that afforded by the present invention. The inventive method requires solely one radio link or fixed line, and the number of soldiers or other individuals may be practically unlimited.

The inventive method also enables all data to be saved in a computer, so that the entire sequence of events can be viewed in detail by those persons taking part in the exercise, at a later date.

Figure 6:
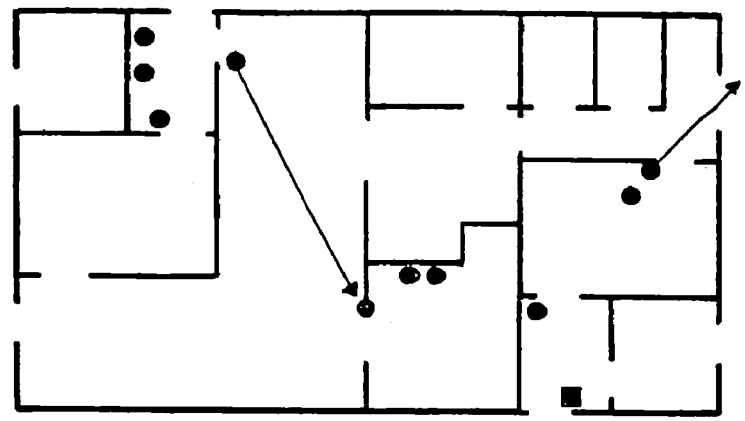
FIG. 6 is an illustration which illustrates how the result of an exercise can be shown on a picture screen in two-dimensions and FIG. 7 is a view corresponding to that of FIG. 6, but in three-dimensions.
Figure 7:
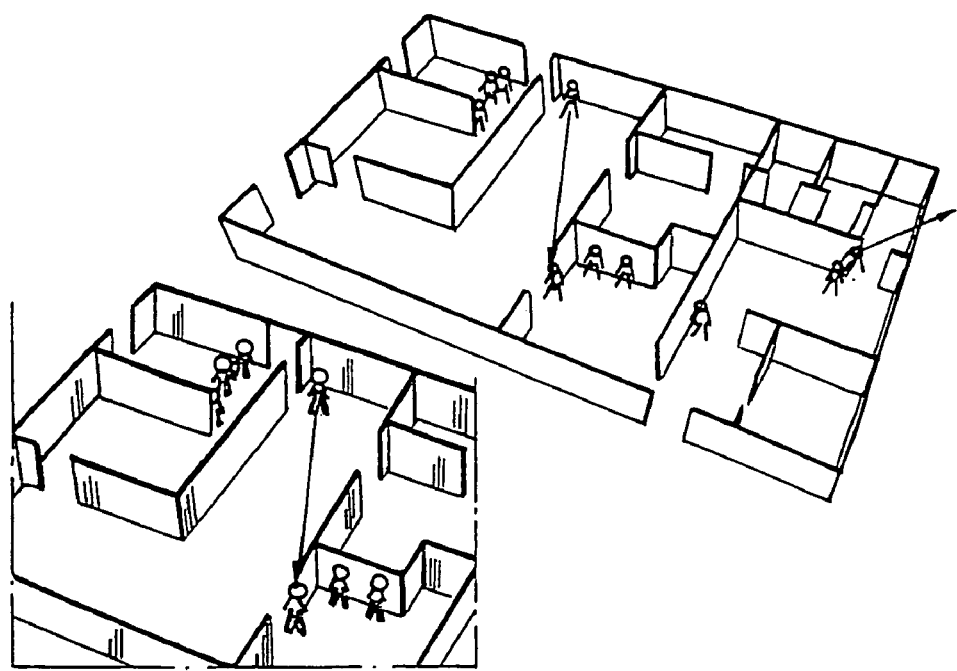

The software used to display the recorded exercise may be constructed to enable the exercise to be seen at several levels, for example an overview of an entire town, an individual building, a room in said building, and down to the level of a particular detail in the room. It is also possible to decide whether or not to show the sequence of events in a two-dimensional picture, FIG. 6, or in a three-dimensional picture, FIG. 7. The display can also be zoomed to show details more clearly, as indicated in FIG. 7. The level of detail in buildings and the like may also be varied and can be created by recording views with the aid, e.g., of digital video cameras.

The invention claimed is:

1. A method of monitoring movements of an individual in and around buildings, rooms and other spaces, wherein each individual carries plural passive transponders with each transponder having an individual-unique identity and that is intended for co-action with an active antenna which is connected, either directly or indirectly, to a monitoring centre (13) for transmitting signals received from transponders, characterised by placing on different parts of the body of said individual the transponders that have individual-unique defined identities, by placing a plurality of antenna loops (16,17,18,19,20) in and around buildings, rooms and other spaces to be monitored for a direct co-action with the transponders carried by the individual, by registering the presence the transponders within a detection range of one of the antenna loops to obtain a positioning of each of the transponders carried by the individual, and by using the signals sent to the monitoring centre (13) to show movements of individuals as a three-dimensional animated picture on a picture screen, wherein the individual is displayed as an animated non-static three-dimensional picture of the individual and the three-dimensional picture of the individual changes as the individual moves.

2. A method according to claim 1, characterised by placing transponders on feet, a knee, a stomach and hands of respective individuals and the three dimensional animated picture of the individual shows the way in which the individual moves to three-dimensionally display walking, creeping and wriggling of the individual.

3. A method according to claim 1, characterised by placing antenna loops around window openings (16) and door openings (17) in said buildings.

4. A method according to claim 1, characterised by placing antenna loops generally evenly over the entire floor surface (18) in respective buildings.

5. A method according to claim 1, characterised by providing objects (21) in and around the building with transponders, and by using signals sent to the monitoring centre (13) to show movements of each object as an animated three-dimensional picture of each object, wherein each object is displayed as a non-static three dimensional animated picture of the object that changes as the object moves.

6. A method according to claim 1, characterised by providing exercise material with transponders.

7. A method according to claim 1, characterised by providing the buildings with hit acknowledging detectors which function to register simulated hits on the building and which are coupled to the antenna loops.

8. A method according to claim 1, characterised by providing exercise material including weaponry, hand grenades, and explosive material with transponders.

9. The method of claim 1, wherein, the three dimensional animated picture of the individual shows the way in which the individual moves to display walking, creeping and wriggling of the individual.

10. The method of claim 1, wherein, the three dimensional animated picture of the individual shows the way in which the individual moves to display walking and creeping of the individual.

11. The method of claim 1, wherein, the transponders are placed on plural of feet, knees, a stomach and hands of the individual, and the three dimensional animated picture of the individual shows the way in which the individual moves to display walking and, creeping of the individual.

12. A method of monitoring movements of an individual in and around buildings, rooms and other spaces, comprising the steps of:

providing plural antenna loops within a monitoring space;

providing an active antenna in communication with a monitoring center and in communication with each antenna loop;

placing plural passive transponders on different parts of an individual;

each transponder having a different individual-unique identity, having the antenna loops directly co-act with the transponders to obtain signals representing an exact three-dimensional position of the individual;

having the obtained signals sent via the active antenna to the monitoring center; and using the signals sent to the monitoring center to show, on a screen, movements of the individual as a three-dimensional animated picture of the individual within the monitoring space, wherein the three-dimensional picture of the individual three-dimensionally changes on the screen as the individual moves within the monitoring space.

13. A method according to claim 12, wherein, transponders are placed on feet, knees, a stomach and hands of the individual.

14. A method according to claim 12, wherein, the transponders are placed on plural of feet, knees, a stomach and hands of the individual.

15. The method of claim 12, wherein, the transponders are placed on plural of feet, knees, a stomach and hands of the individual, and the three dimensional animated picture of the individual shows the way in which the individual moves to three-dimensionally display walking and creeping of the individual.

16. The method of claim 12, wherein, objects (21) in and around the monitoring space are provided with object-transponders, and using signals generated from the object-transponders to show movements of each object as an animated three-dimensional picture of each object, wherein each object is displayed as a non-static three dimensional animated picture of the object that changes three-dimensionally as the object moves.

17. A method of monitoring movements of an individual in and around buildings, rooms and other spaces, comprising the steps of:

providing plural antenna loops within a monitored area;

placing plural passive transponders on different parts of an individual, each transponder having a different individual-unique identity;

having the antenna loops co-act with the transponders to obtain signals representing an exact three-dimensional position of the different parts of the individual; and using the signals to show, on a screen, movements of the individual as a three-dimensional animated individual within the monitored area, wherein the three-dimensional picture of the individual three-dimensionally changes on the screen as the individual moves within the monitored area.

18. The method of claim 17, wherein, the transponders are placed on plural of feet, knees, a stomach and hands of the individual, and the three dimensional animated picture of the individual shows the way in which the individual moves to three-dimensionally display walking and creeping of the individual.

19. The method of claim 17, wherein, objects (21) in and around the monitored area are provided with object-transponders, and using signals generated from the object-transponders to show movements of each object as an animated three-dimensional picture of each object, wherein each object is displayed as a non-static three dimensional animated picture of the object that changes three-dimensionally as the object moves.

* * * * *